(12) United States Patent
Meyer et al.

(10) Patent No.: US 8,561,628 B2
(45) Date of Patent: Oct. 22, 2013

(54) CONTINUOUS GAS SERVICE RESTORATION AND METER CHANGE-OUT SYSTEM

(75) Inventors: Winston Charles Meyer, Spring, TX (US); Michael Zandaroski, Coon Rapids, MN (US); Thomas Seifert, Maple Grove, MN (US); Dimitri Karastamalis, Sugar Land, TX (US); Scott Ogren, Houston, TX (US); James Rutherford, Cyress, TX (US); Daniel Kim, Pearland, TX (US); Ronald G. Van Gossen, East Bernard, TX (US); John Fisher, West Columbia, TX (US); Graham Midgley, Kingwood, TX (US); Paul Wehnert, Kemah, TX (US); Chris Hambrick, League City, TX (US)

(73) Assignee: Centerpoint Energy Mobile Energy Solutions, Inc., Houston, TX (US)

( * ) Notice: Subject to any disclaimer, the term of this patent is extended or adjusted under 35 U.S.C. 154(b) by 427 days.

(21) Appl. No.: 12/986,840

(22) Filed: Jan. 7, 2011

(65) Prior Publication Data

US 2011/0100482 A1    May 5, 2011

Related U.S. Application Data

(63) Continuation-in-part of application No. 12/198,581, filed on Aug. 26, 2008, now Pat. No. 7,975,713.

(60) Provisional application No. 61/018,819, filed on Jan. 3, 2008.

(51) Int. Cl.
G01F 15/18    (2006.01)
F16K 43/00    (2006.01)

(52) U.S. Cl.
USPC ............... 137/15.03; 137/315.06; 312/1

(58) Field of Classification Search
USPC ............ 137/15.03, 315.06, 316; 312/1
See application file for complete search history.

(56) References Cited

U.S. PATENT DOCUMENTS

| | | | |
|---|---|---|---|
| 4,327,760 A | 5/1982 | Lancaster | 137/15 |
| 4,532,688 A | 8/1985 | Dewberry | 29/402.08 |
| 5,299,243 A * | 3/1994 | Picco | 312/1 |
| 5,437,300 A | 8/1995 | Winnie et al. | 137/112 |
| 5,662,581 A * | 9/1997 | Jennrich et al. | 312/1 |
| 5,741,969 A * | 4/1998 | Sebastopoli | 137/15.03 |
| 5,934,304 A | 8/1999 | Peterson et al. | 137/15 |
| 7,975,713 B2 * | 7/2011 | Meyer et al. | 137/315.06 |

* cited by examiner

*Primary Examiner* — Kevin Lee
(74) *Attorney, Agent, or Firm* — Baker Botts L.L.P.

(57) ABSTRACT

An assembly for maintaining flow between an inlet conduit and an outlet conduit. The assembly may include a first plate having an inlet notch sized to engage the inlet conduit and an outlet notch sized to engage the outlet conduit, and a second plate having an inlet notch sized to engage the inlet conduit and an outlet notch sized to engage the outlet conduit. The assembly may also include a first connecting member coupled to the first plate and the second plate and a bag having at least one glove port coupled to a second connecting member. The first connecting member may be connected to the second connecting member.

38 Claims, 14 Drawing Sheets

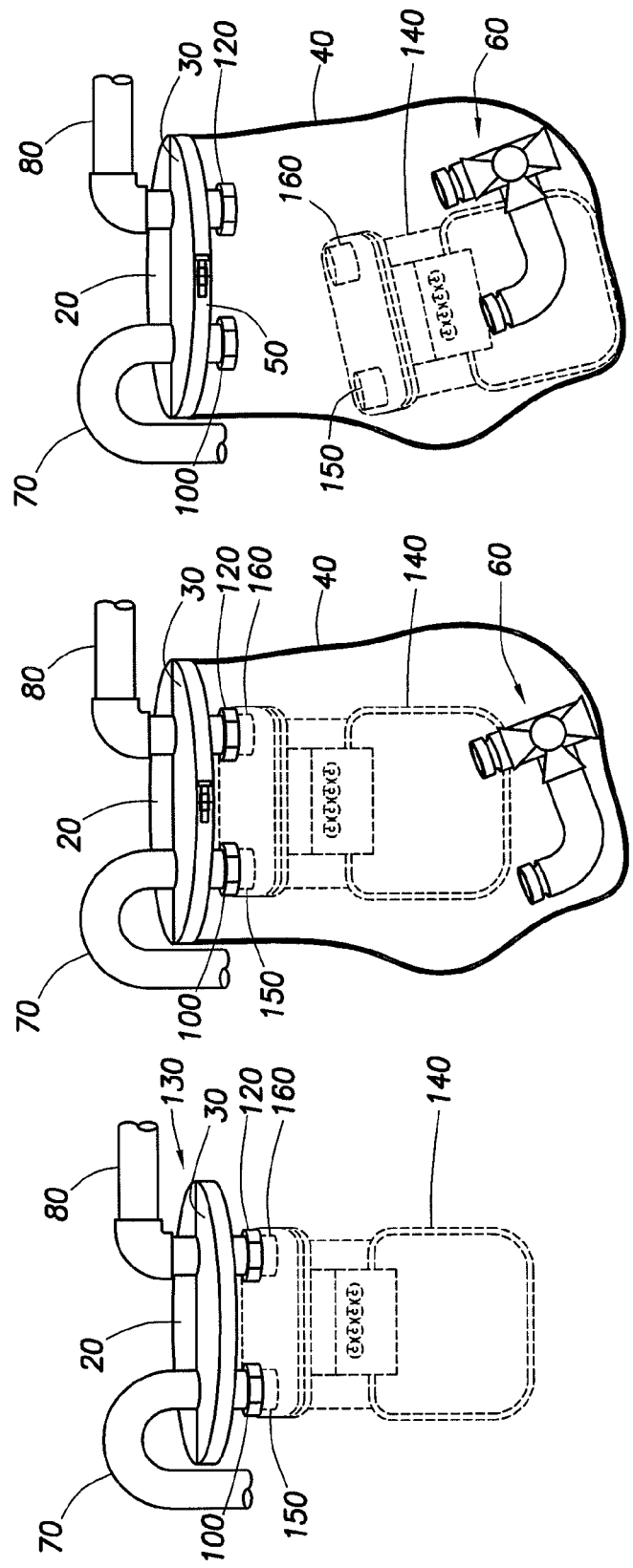

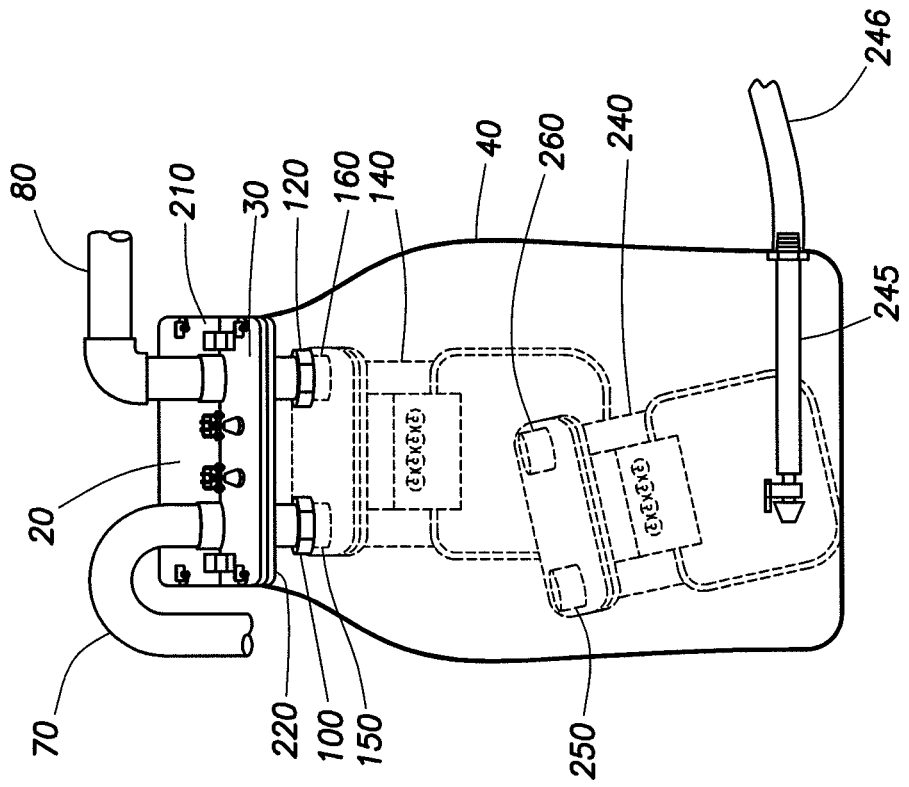
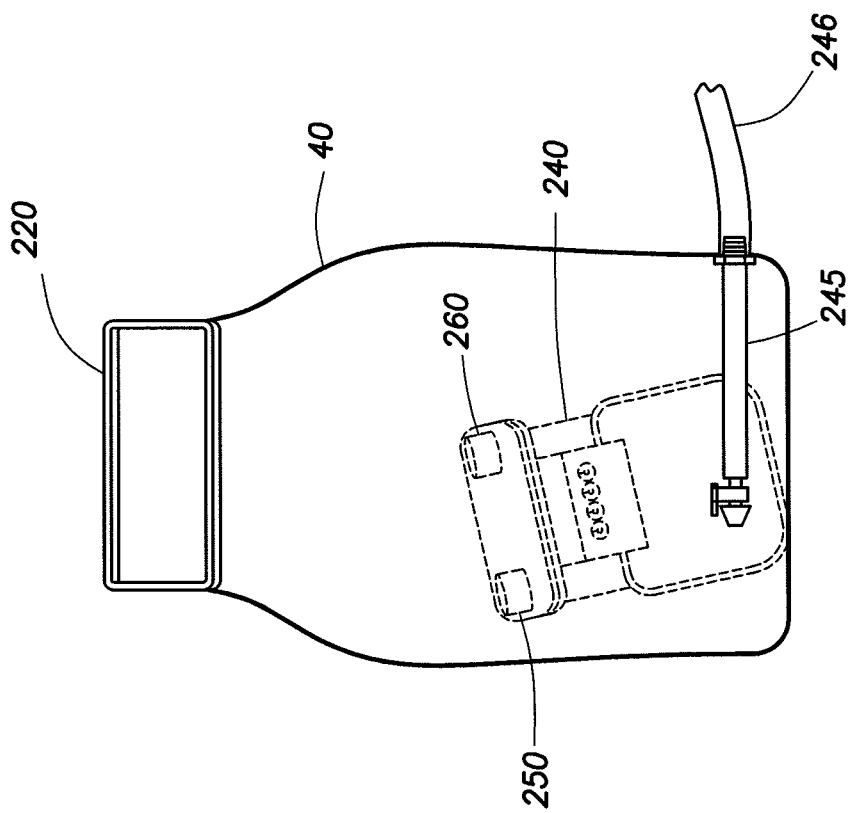

CONTINUOUS GAS SERVICE RESTORATION AND METER CHANGE-OUT SYSTEM

CROSS-REFERENCE TO RELATED APPLICATIONS

This application is a continuation-in-part of U.S. patent application Ser. No. 12/198,581, filed on Aug. 26, 2008, now U.S. Pat. No. 7,975,713, which was published on Jul. 9, 2009, as US 2009/173392A1 and claims priority to U.S. Patent Application Ser. No. 61/018,819 filed Jan. 3, 2008. U.S. application Ser. Nos. 12/198,581 and 61/018,819 are both incorporated by reference herein in their entirety.

BACKGROUND

The present invention relates to natural gas piping and, more particularly, in certain embodiments, to assemblies for providing continuous gas flow and associated methods.

To determine the amount of gas a customer consumes, a gas company interposes a gas meter in the gas line leading into each customer's building. The gas meter connects a line leading from a gas supply to a service line extending to the point of use.

The vast majority of meter sets in the United States do not have a bypass and thus require interruption of gas supply when servicing. Furthermore, providing service restoration between any inlet conduit and outlet conduit can also cause an interruption of gas service to the customer. Any interruption in gas service may cause pilot lights to become extinguished requiring the gas company to enter the premises, inspect, and relight the pilot lights. An interrupted gas service typically requires safety inspections and relighting pilot lights which result in increased costs, creates customer inconvenience, and may pose additional safety hazards. In short, interruption to gas service fosters ill will with customers, difficulty in work scheduling, additional work to perform turn-on and service restoration, and requires significant time.

SUMMARY

The present invention relates to natural gas piping and, more particularly, in certain embodiments, to assemblies for providing continuous gas flow and associated methods.

In one embodiment, the present invention is directed to an assembly for maintaining fluid flow between an inlet conduit and an outlet conduit, the assembly comprising: a first plate having an inlet notch sized to engage the inlet conduit and an outlet notch sized to engage the outlet conduit; a second plate having an inlet notch sized to engage the inlet conduit and an outlet notch sized to engage the outlet conduit; a first connecting member integrally formed with the first plate and the second plate; a bag connectable to the first and second plates and having at least one glove port; wherein the bag is connected to a second connecting member; and a latch, wherein the latch connects the first connecting member to the second connecting member.

In one embodiment, a method for changing an old meter with a new meter, includes providing a first plate and a second plate, each having a first notch sized to engage the inlet conduit and a second notch sized to engage the outlet conduit; mating the first plate and the second plate in engagement with the inlet conduit and the outlet conduit; providing a bag connectable to the first and second plates; placing the new meter in the bag; loosening connections between the old meter and the inlet conduit and the outlet conduit; connecting the bag to the first and second plates; pressurizing the bag; removing the old meter connected to the inlet conduit and the outlet conduit; wherein the step of removing the meter is performed after connecting the bag; fluidly connecting the new meter to the inlet conduit and the outlet conduit; and removing the bag.

In another embodiment, the present invention is directed to an assembly for maintaining fluid flow between an inlet conduit and an outlet conduit, the assembly comprising: a first plate having an inlet notch sized to engage the inlet conduit and an outlet notch sized to engage the outlet conduit; a second plate having an inlet notch sized to engage the inlet conduit and an outlet notch sized to engage the outlet conduit; a first connecting member coupled to the first plate and the second plate; a bag having at least one glove port coupled to a second connecting member; and means for connecting the first connecting member to the second connecting member.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIGS. 5a-5e are perspective views of various stages of one embodiment of a meter change-out operation in accordance with one embodiment of the present invention.

FIGS. 6a-6e are perspective views of various stages of one embodiment of a meter change-out operation in accordance with another embodiment of the present invention.

DESCRIPTION OF PREFERRED EMBODIMENTS

The present invention relates to natural gas piping and, more particularly, in certain embodiments, to assemblies for providing continuous gas flow and associated methods.

There may be several potential advantages to the methods and apparatus of the present invention, only some of which may be alluded to herein. One of the many potential advantages of the methods and apparatuses of the present invention is that using the apparatuses and methods described herein, gas pipelines may undergo meter change-outs and other repair operations without an interruption to a customer's gas service. Another potential advantage of the methods and apparatuses of the present invention is that by using the apparatuses and methods described herein, customers' pilot lights may not become extinguished during service and thus customers may not be inconvenienced by the need to be present during meter change-outs and various gas repair operations.

Figure 1:
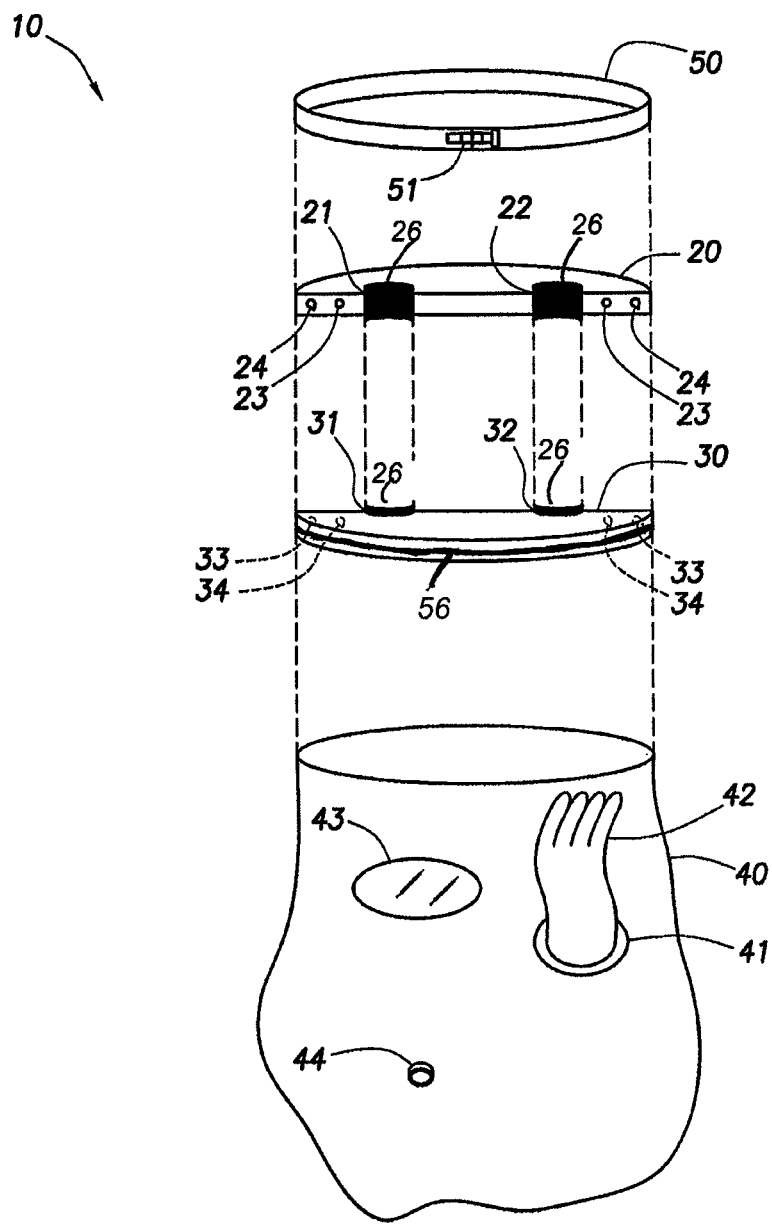
FIG. 1 is a partially exploded view of a meter change-out assembly in accordance with one embodiment of the present invention.

Referring now to FIG. 1, meter change-out assembly 10 may have a first plate 20, a second plate 30, a bag 40, and a collar 50. First plate 20 and second plate 30 may cooperate to encircle an outer wall of an inlet conduit 70 (shown in FIG. 2) and an outer wall of an outlet conduit 80 (shown in FIG. 2). Plates 20, 30 may be constructed out of any type of material. In some embodiments, plates 20, 30 may be constructed out of aluminum or other metal, plastic, wood, polyethylene, vinyl, polyvinyl chloride ("PVC"), derivatives thereof, combinations thereof, or any other material suitable for use in gas applications. In one exemplary embodiment, the plates 20, 30, may be transparent to allow the user to easily see inside the bag 40.

Plates 20, 30 may be substantially flat, but the term "plate" should not be limited to any particular thickness dimension. First plate 20 may have inlet notch 21 to engage the inlet conduit and outlet notch 22 to engage the outlet conduit, and second plate 30 may have similar inlet notch 31 and outlet notch 32. Notches 21, 22, 31, 32 may be semicircular, or any other shape suitable for engaging conduits 70, 80. Notches 21, 22 may be positioned along the perimeter of first plate 20 and notches 31, 32 may be positioned along the perimeter of second plate 30. Inlet notches 21, 31 and outlet notches 22, 32 may be sized and positioned to cooperatively engage the outer walls of conduits 70, 80. In certain embodiments, inlet notches 21, 31 are situated on a same general side of respective plates 20, 30 as outlet notches 22, 32.

Plates 20, 30 may be of any size or shape suitable for engaging conduits 70, 80. In certain embodiments, plates 20, 30 form an elliptical shaped perimeter when engaged with one another around conduits 70, 80. Thus, plates 20, 30 may each form a half-ellipsis. While an ellipsis is disclosed, any of a number of shapes may be formed by the union of the plates 20, 30. In certain embodiments, when engaged, the plates 20, 30 form a shape that permits bag 40 to be sealed around the perimeter. Further, plates 20, 30 need not be identical, but rather may have different shapes suitable for engagement around conduits 70, 80 in a variety of configurations. Thus, plates 20, 30 may joined about conduits 70, 80 such that conduits 70, 80 are disposed at any of an unlimited number of locations within plates 20, 30. This feature may permit accessible workspace and facilitate attachment of meter change-out assembly 10 in any number of applications, including those where meter 140 (shown in FIG. 2) is very close to a building.

In some embodiments, one or both plates 20, 30 may include rotating cams to permit adjustment of notches 21, 31, 22, and 32 to allow the centerline of notches 21, 22, 31, 32 to be adjusted or otherwise accommodate various spacing between conduits 70, 80. While rotating cams are disclosed, one skilled in the art would appreciate that various techniques may be used to adjust notches 21, 31, 22, 32 for engaging conduits 70, 80 which may vary in type, size, and relative dimensions. One of ordinary skill in the art with the benefit of this disclosure would appreciate that various embodiments may be combined to arrive at many useful mating configurations dependent upon type of meter 140, and type, size and relative dimensions of conduits 70, 80. The configurations disclosed herewith are generally by way of illustration and do not limit other configurations that may arise, that may be suitable to the application.

In some embodiments, either or both plates 20, 30 may have one or more alignment devices designed to assist in the alignment of plates 20, 30. In certain embodiments, alignment devices also prevent relative rotation between plates 20, 30 when assembled around conduits 70, 80. As illustrated, alignment devices may include pins for use in holes 23, 24, 33, and 34 situated on the same side of plates 20, 30 as notches 21, 22, 31, 32. While a particular configuration of holes 23, 24, 33, and 34 is illustrated, any number of variations of alignment devices can be used.

Figure 1A:
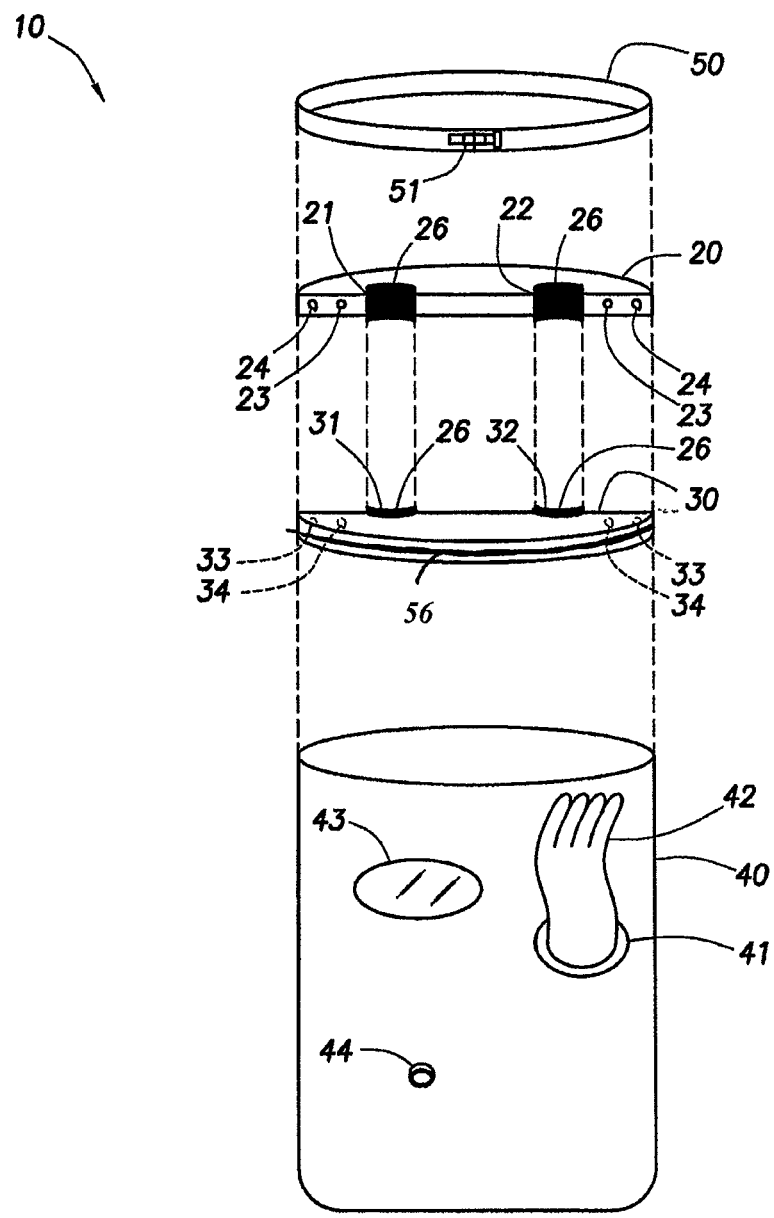
FIG. 1A is a partially exploded view of a meter change-out assembly in accordance with another embodiment of the present invention.

Bag 40 may be of any suitable size or shape. As shown in FIG. 1A, in one exemplary embodiment, the bag 40 may be designed to have a substantially flat bottom surface. The cross-section of the bag 40 may take on any suitable shape, including, but not limited to, a circle, an ellipses, a square, and a rectangle. In the exemplary embodiment of FIG. 1A, the bag 40 has a substantially square cross-sectional area, and when pressurized may take on a substantially cubic shape. The use of a substantially flat bottom surface for the bag 40 increases the space available for operations using the meter change-out assembly 10.

In some embodiments, bag 40 may be formed with a narrowed neck portion, allowing for sealing engagement with plates 20, 30 at the neck portion. In other embodiments, bag 40 may be shaped and sized so as to be otherwise easily positioned to contact the perimeter formed by plates 20, 30 when positioned in engagement with conduits 70, 80.

Bag 40 may be constructed from derivatives of polyvinyl, reinforced vinyl, plastic, cloth, and combinations thereof, or any other material capable of holding a gas under pressure. Bag 40 may be disposable or bag 40 may be reusable. One skilled in the art would recognize that dependent upon application, materials, and conditions it may be useful to employ bag 40 which may be capable of one-time use or multiple uses. If bag 40 is reusable, it may have various interchangeable parts for replacement and/or repair.

Figure 1B:
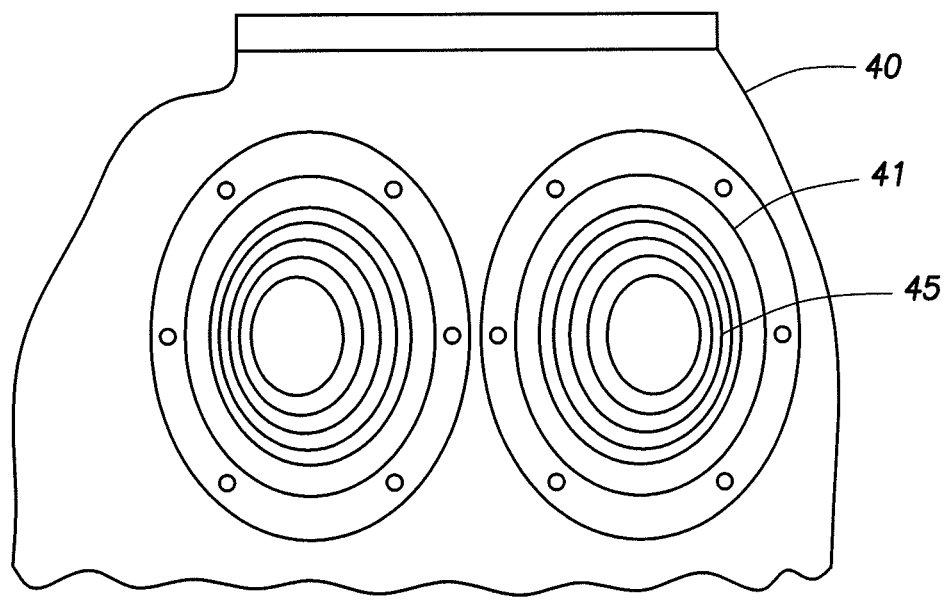
FIG. 1B is a perspective view of a glove port for a meter change-out assembly in accordance with an embodiment of the present invention.

Bag 40 may have at least one glove port 41, located at any point along the surface of bag 40. Glove port 41 may be sized to allow a person to manipulate any device or gas component located in bag 40. In one embodiment, as shown in FIG. 1B, the glove port 41 may be elliptical in shape. As shown in FIG. 1B, in one exemplary embodiment the major axis of the elliptical glove port 41 may be vertically positioned relative to the bag 40. As would be appreciated by those of ordinary skill in the art, with the benefit of this disclosure, an elliptical glove port 41 improves the range of movements available to a user and allows better access to the components located in the bag 40. Glove port 41 may be constructed out of polyvinyl, plastic, cloth, or any suitable material that is capable of holding a gas under pressure and engaging a glove 42 to bag 40. In certain embodiments, glove port 41 may be welded to bag 40. Alternatively, glove port 41 may be welded by heat-shrinking, adhesives, stitching and combinations thereof, or any manner capable of creating permanent adhesion of the glove port 41 to bag 40 and capable of containing a gas under pressure. In yet other embodiments, glove port 41 may be attached semi-permanently by inter-locking plates, screws, removable fasteners, and combinations thereof capable of permitting the replacement of the glove port 41. In some embodiments, glove port 41 is configured to allow convenient detachment of glove 42 from bag 40. This may allow glove 42 to be easily replaced. Alternatively, glove port 41 may be formed by a direct connection between glove 42 and bag 40. Glove 42 may be constructed of rubber, polyvinyl, plastic, cloth, combinations thereof, or any suitable material that is capable of containing a gas under pressure. One skilled in the art would appreciate that glove 42 may be any glove, mitt or combination thereof that may permit service of the meter and various repair operations by hand or tool as may be appropriate.

Figure 1C:
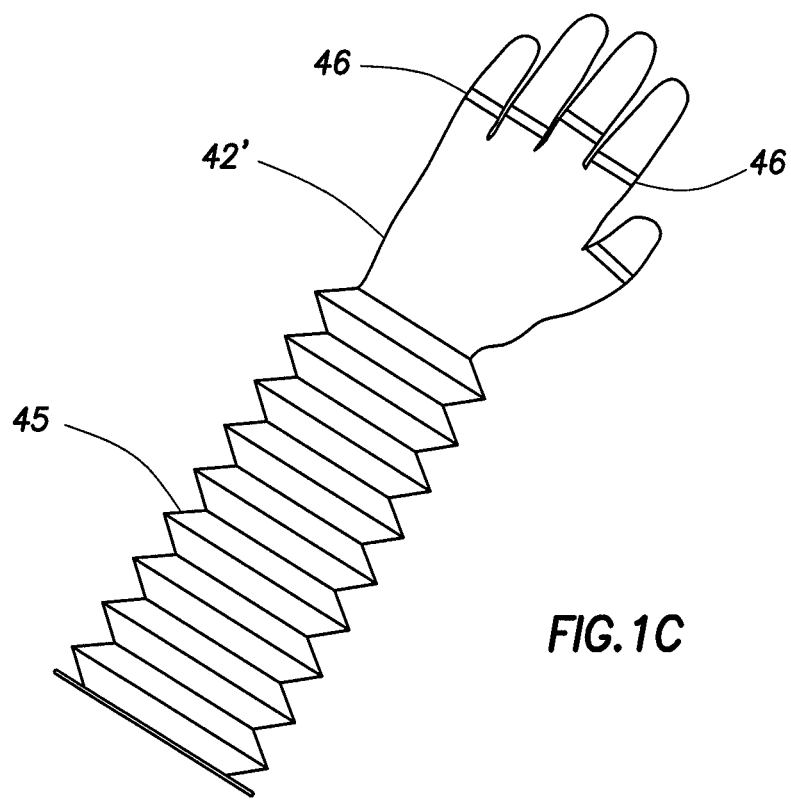
FIG. 1C is a top view of a glove and sleeve for a meter change-out assembly in accordance with an embodiment of the present invention.

As would be appreciated by those of ordinary skill in the art, with the benefit of this disclosure, during the operation of the meter change-out assembly 10, the bag 40 may be pressurized by the gas contained therein. The pressure in the bag 40 exerts a force on the glove 42 and its sleeve which the user has to endure when manipulating components inside the bag 40. The impact of this force may be magnified in instances where a user has to remove his hand from the glove 42 when operating the meter change-out assembly 10. Due to the pressure from the gas inside the bag 40, the glove 42 and its sleeve may be turned inside out and/or pushed out of the bag 40 through the glove port 41. The user would then have to exert some force in order to return the glove 42 and its sleeve into the bag 40 to continue manipulating the components contained therein. As shown in FIGS. 1B and 1C, in one exemplary embodiment, the glove 42' may be attached to the bag 40 by an accordion sleeve 45. Because of its shape, the accordion sleeve 45 can better withstand the force exerted thereon by the gas inside the bag 40. In one exemplary embodiment, the bellows of the accordion sleeve 45 may be reinforced with rings to further improve its ability to withstand the exerted force. The accordion sleeve 45 of the glove 42' may reduce the force exerted on the user when operating the meter change-out assembly 10 and may prevent the sleeve from being pushed out through the glove port 41 upon removal of the user's hand from the glove 42'. In one exemplary embodiment, the glove 42' may be further reinforced by rings 46 that are placed around one or more of the fingers of the glove 42'. The rings 46 assist in maintaining the shape of the glove 42' if the user removes his hands during operations and help prevent the glove 42' from turning inside out. As would be appreciated by those of ordinary skill in the art, with the benefit of this disclosure, the reinforcing accordion sleeve 45 rings and the glove finger rings 46 may be made from any suitable material, including, but not limited to Polysopren, Styrene Butadiene, Chloropren, and Butadiene Acrylonitrile.

Accordingly, the accordion sleeve 45 prevents blow back due to the exerted force by the gas; reduces pressure exerted on the forearms of the user; and minimizes pressure and volume fluctuations inside the bag 40 as the user moves his hands around.

Figure 1D:
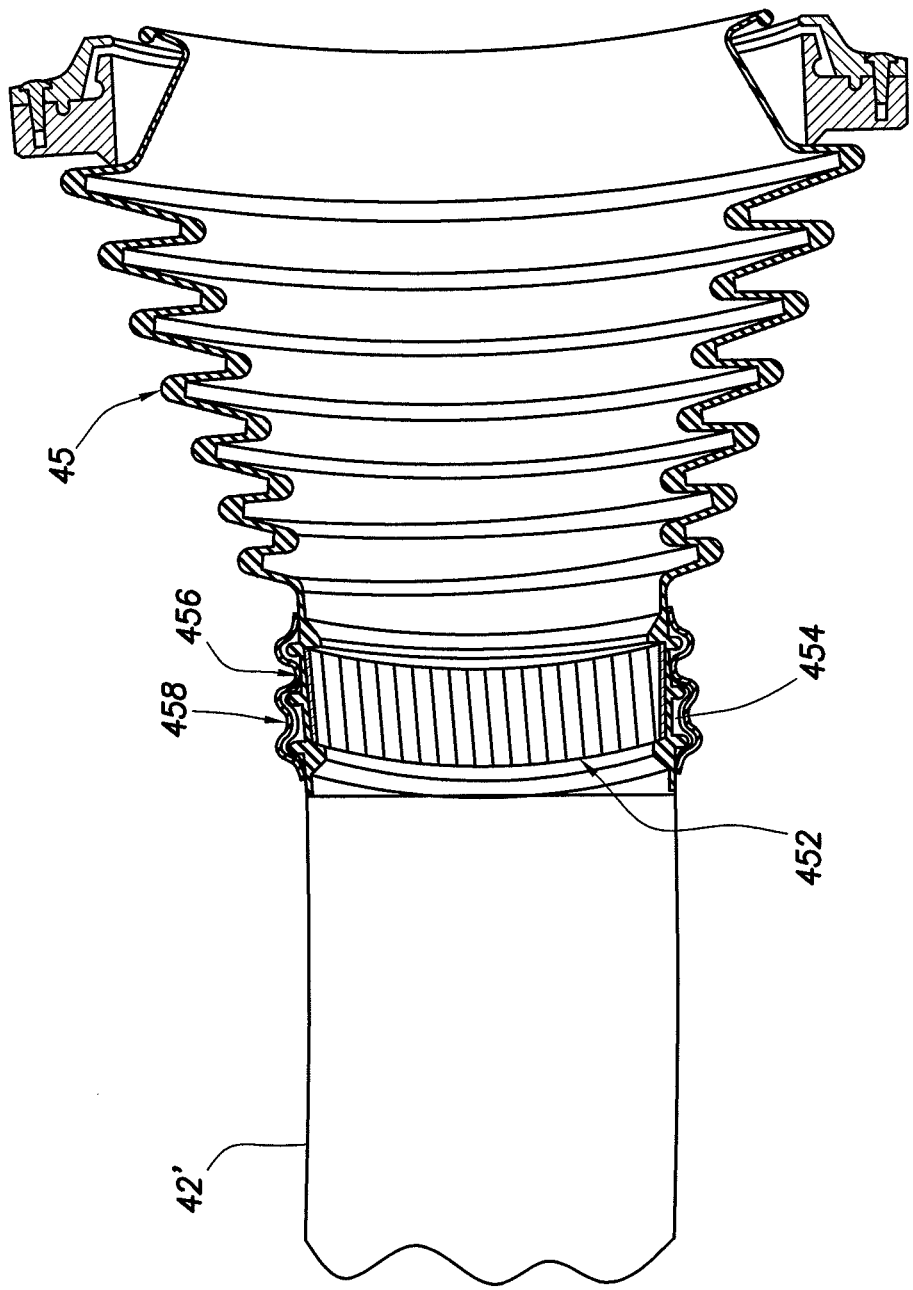
FIG. 1D is a partial cross-sectional view of the glove and sleeve of FIG. 1C in accordance with an embodiment of the present invention.

In one exemplary embodiment, the accordion sleeve 45 may be a separate piece from the glove 42'. FIG. 1D depicts a cross-sectional view of the accordion sleeve 45 of FIG. 1C in accordance with an exemplary embodiment of the present invention. In one embodiment, an inner ring 452 may be placed inside the accordion sleeve 45, near an end of the accordion sleeve 45 that interfaces with the glove 42'. This portion of the accordion sleeve 45 may be referred to as the glove interface. The accordion sleeve 45 may also include one or more channels 454 on the perimeter of its outer surface corresponding to the location of the inner ring 452. In one exemplary embodiment, there may be two channels 454 formed on the accordion sleeve 45. The glove 42' may then be coupled to the sleeve 45 by placing the glove 42' over the outer surface of the accordion sleeve 45 so that at least a portion of the glove 42' fits over the channels 454. With the inner ring 452 supporting the accordion sleeve 45 surface, one or more retention straps 456 may be secured around the outside of the glove 42' and compress the glove 42' into the channels 454. As would be appreciated by those of ordinary skill in the art, with the benefit of this disclosure, this arrangement provides an air tight seal that can withstand movement during operations using the meter change-out assembly 10. In one exemplary embodiment, an outer band 458 may be placed over the retention straps 456 to cover any sharp edges and make the design more aesthetically pleasing. As would be appreciated by those of ordinary skill in the art, although the use of the inner ring 452 and the channels 454 is discussed in conjunction with the accordion sleeve 45, the inner ring 452 and channels 454 may also be used in other embodiments of the present invention where the sleeve is not accordion shaped.

Bag 40 may have at least one view port 43, located at any point along the bag 40. View port 43 may be constructed out of polyvinyl, plastic, cloth, Plexiglas®, glass, or any suitable material that permits a technician to view the interior of bag 40. Alternatively, view port 43 may be eliminated and bag 40 may be constructed out of any suitable transparent or translucent material that is capable of holding a gas under pressure.

Bag 40 may have at least one external connection port 44, located at any point along bag 40. External connection port 44 may be sized to provide gas from an external source. In some embodiments, external connection port 44 may permit the purging of gas from within bag 40. While external connection port 44 is illustrated on bag 40, it may alternatively be situated on either plate 20, 30. Further, depending on the application, multiple external connection ports 44 could be used for various purposes. Various external connection ports 44 may include but are not limited to use of a quick-disconnect or quick-connect device to facilitate engagement and disengagement of connections. In other embodiments, external connection port 44 may not be required and may be omitted.

Collar 50 may be formed to mechanically connect bag 40 to perimeter 130 (shown in FIG. 2) formed when mated plates 20, 30 are engaged with conduits 70, 80. In some embodiments, collar 50 may be a stainless steel band that encircles and clamps to plates 20, 30 and surrounding bag 40. In these embodiments, fastener 51 may clamp collar 50 around bag 40 to plates 20, 30 via tool adjustment. In other embodiments, fastener 51 may be adjustable via hand, or otherwise, to a tension adequate to maintain a seal that permits gas containment. Collar 50 may be constructed out of metal, plastic, PVC, rubber, elastomer, polymers, fabrics, or any other suitable material. While a band-shaped collar is shown, collar 50 may be of any suitable shape or size. For example, in certain embodiments, collar 50 may be disposed within the outer edge of the open end of bag 40.

In some embodiments, meter change-out assembly 10 may include a support assembly 9 to provide support to plates 20, 30 when attached to conduits 70, 80. Support assembly 9 may additionally maintain distance between conduits 70, 80 and provide support for meter 140 (shown in FIG. 2) within bag 40. Meter 140 may be supported via support strap (not shown) connected to meter 140 at one end and connected to support assembly at the other. In certain embodiments, support assembly 9 may be a split bar, support plate or support structure formed into plates 20, 30, combinations thereof or any device that may provide appropriate support for plates 20, 30.

As one skilled in the art would appreciate, there are many methods for providing additional support to plates 20, 30 and support assembly 9 may or may not be required, depending upon the application.

Figure 1E:
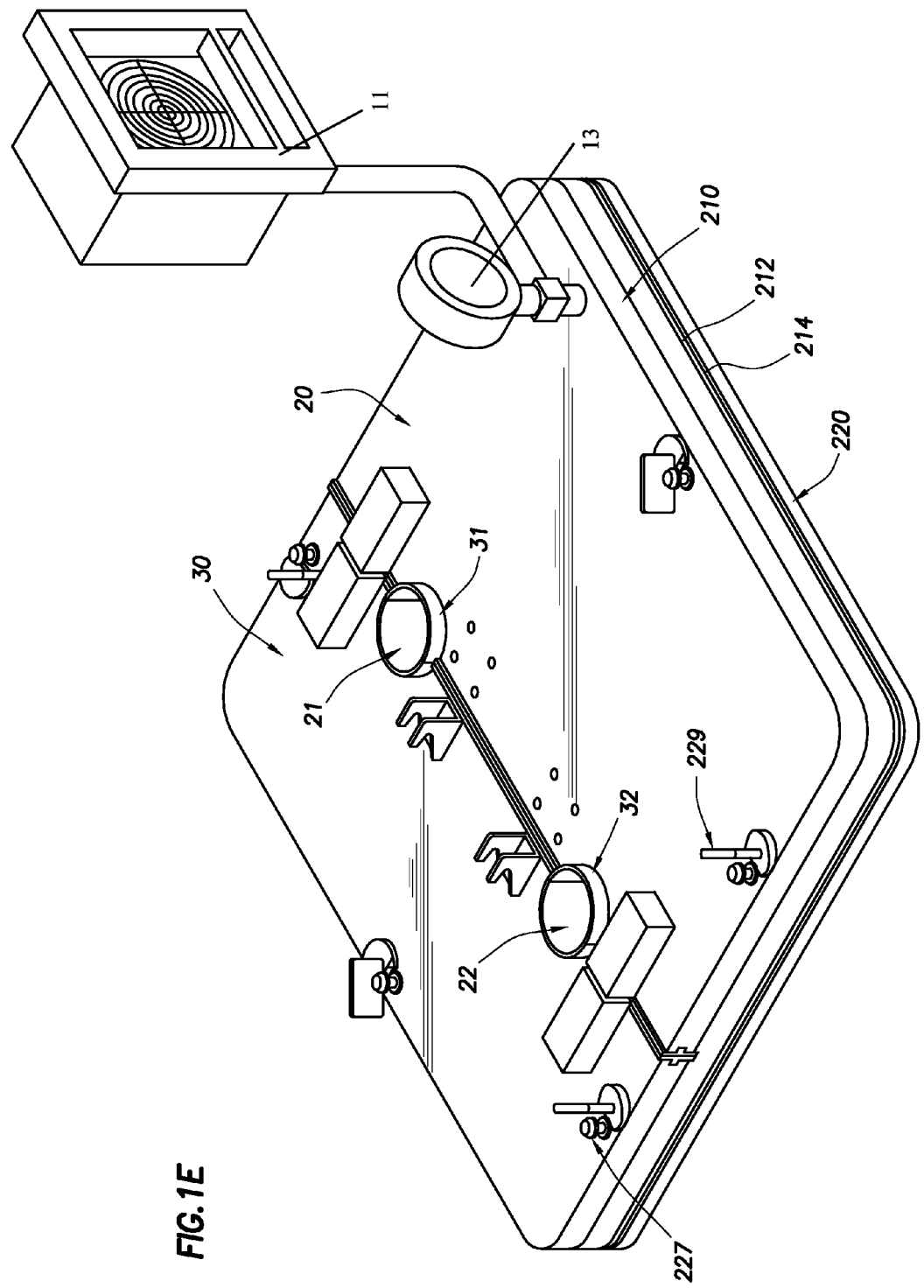
FIG. 1E is a perspective view of a first plate and a second plate for a meter change-out assembly in accordance with an embodiment of the present invention.

As shown in FIG. 1E, in one exemplary embodiment, the collar 50 may be replaced by connecting members 210 and 220. The first connecting member 210 may be coupled to the plates 20, 30. In one exemplary embodiment, the first connecting member 210 may be an integral part of the plates 20, 30. At its opening, the perimeter of the bag 40 may be sealed to the second connecting member 220. In one exemplary embodiment, the bag 40 may be glued to the second connecting member 220. In another exemplary embodiment, the bag 40 may be attached to the second connecting member 220 by Radio Frequency ("RF") welding or ultrasonic welding. The two connecting members 210, 220 may then be coupled to attach the bag 40 to the plates 20, 30. In one exemplary embodiment, a latch may be used to join the two connecting members 210, 220. In one embodiment, the latch may be a cam lock including a number of protrusions 227 on the second connecting member 220 that may be locked in by turning the corresponding locking mechanisms 229 on the first connecting plate 210.

In one exemplary embodiment, the first connecting member 210 may include a gasket 212 around its outer perimeter where the first connecting member 210 interfaces with the second connecting member 220. The gasket 212 may extend beyond the surface of the first connecting member 210. Similarly, the second connecting member 220 may include a gasket 214 around its perimeter corresponding to the location of the gasket 212. The gaskets 212, 214 may then be pushed together as the first connecting member 210 and the second connecting member 220 are tightened together, thereby creating a seal between the two connecting members 210, 220.

In some embodiments, meter change-out assembly 10 may include one or more seals (not shown) to minimize or prevent gas leaks around and between the various components of meter change-out assembly 10, such as, but not limited to, between the plates 20, 30 and the conduits 70, 80, between the perimeter of plates 20, 30 and collar 50, or between the two connecting members 210, 220. In some embodiments, bag 40 may be capable of self-sealing around the perimeter of plates 20, 30. In other embodiments, the seal may be a strip of material, an o-ring or any other type of seal capable of minimizing or preventing gas leaks. One skilled in the art would possess suitable technical knowledge to ensure that the seal would maintain a sufficient engagement between and around plates 20,30 and the various components of meter change-out assembly 10 to ensure gas may be suitably contained under pressure.

Figure 2:
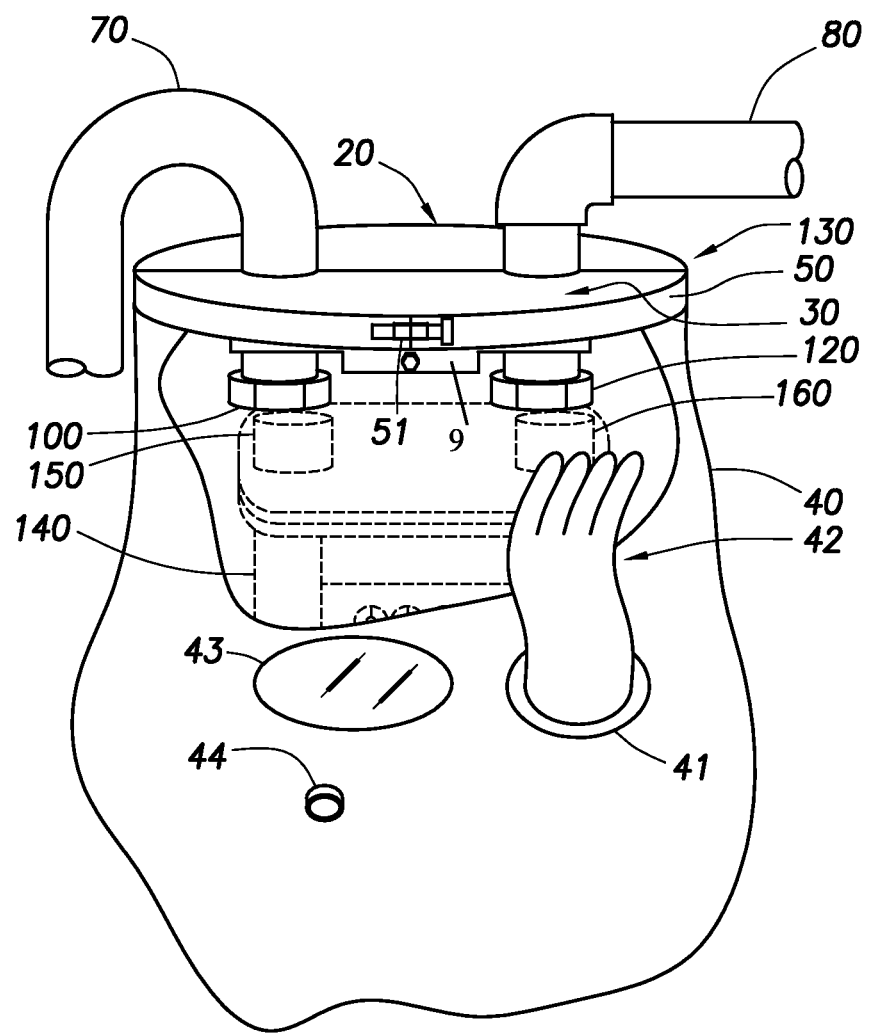
FIG. 2 is a perspective view of a meter change-out assembly installed over a gas meter in accordance with one embodiment of the present invention.

Referring now to FIG. 2, one embodiment of the meter change-out assembly 10 is illustrated installed around conduits 70, 80. Gas meter 140 may be connected to conduits 70, 80. Inlet conduit 70 may be in fluid communication with meter inlet 150. Outlet conduit 80 may be in fluid communication with meter outlet 160. Plate 20, 30 may be positioned in engagement with conduits 70, 80. Perimeter 130 may be formed along the unmated sides of plates 20, 30 when positioned in engagement with conduits 70, 80. Bag 40 may be positioned along the outside of perimeter 130 and collar 50 connects bag 40 to perimeter 130.

Figure 3:
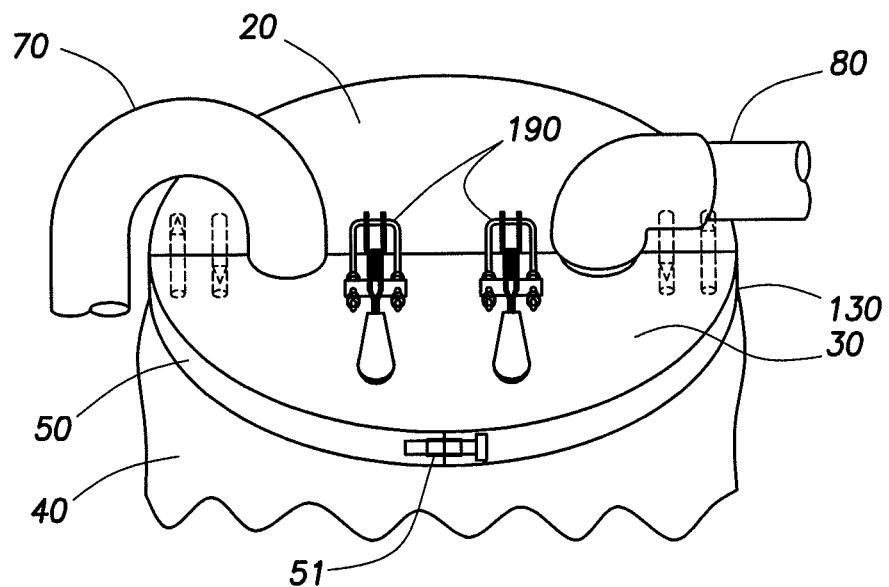
FIG. 3 is a perspective view of a first plate and a second plate having a fastener and alignment devices, installed around an inlet conduit and an outlet conduit in accordance with one embodiment of the present invention.

Referring now to FIG. 3, plates 20, 30 may optionally be held in position about conduits 70, 80 by at least one fastener 190. Fastener 190 may be a latch, clamp, screw, or any other device suitable for joining plates 20, 30.

Figure 4A:
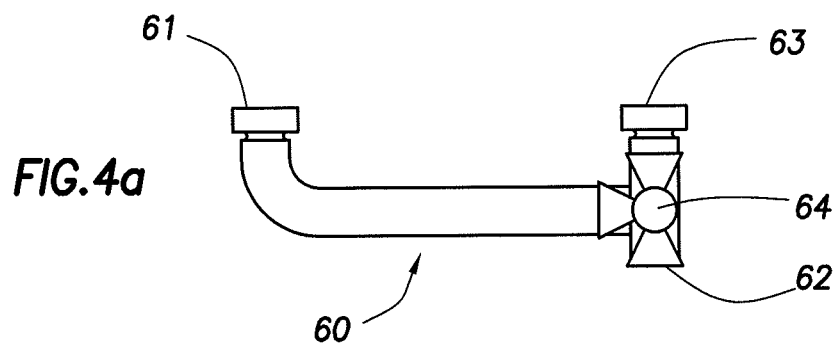
FIGS. 4a and 4b are side views of various embodiments of a bypass assembly.
Figure 4B:
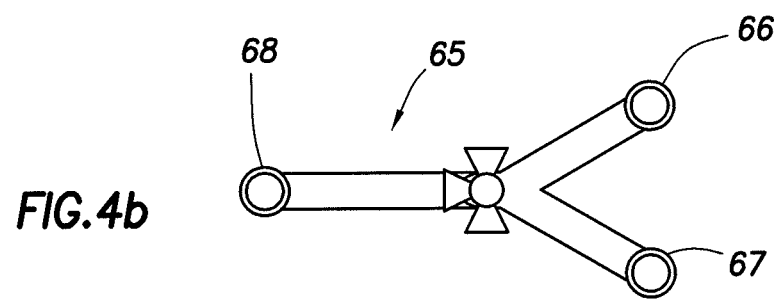

Referring now to FIGS. 4a and 4b, a bypass assembly may be used to switch to external gas flow. In one embodiment, illustrated in FIG. 4a, bypass assembly is a 3-way valve 60. 3-way valve 60 may have inlet 61, inlet 62, outlet 63, and control mechanism 64. Inlet 61 may be configured for connection to inlet conduit 70, inlet 62 may be configured for connection to an external gas supply, and outlet 63 may be configured for connection to outlet conduit 80. Control mechanism 64 may be manipulated to allow gas flow to switch from inlet 61-outlet 63 to inlet 62-outlet 63 or otherwise. In other words, flow to outlet conduit 80 may selectively come from either inlet conduit 70 or an external gas supply.

In other embodiments, the bypass assembly may be a T-valve or Y-valve 65, as shown in FIG. 4b. Y-valve 65 may have inlet/outlet 66, inlet/outlet 67, and inlet/outlet 68. A person of ordinary skill in the art would be able to determine an appropriate type and size of Y-valve 65.

Any of a number of different bypass assemblies may be useful in conducting meter change-outs and gas repair operations. The bypass assembly may be constructed out of reinforced polyvinyl tubing, plastic, metal, rubber, a combination thereof, or any suitable material that is capable of holding a gas under pressure and engaging one or both conduits 70, 80. The bypass assembly may be sized to fit, for example, but not by way of limitation, relative spacing of 6", 8", or 12" between conduits 70, 80. A person of ordinary skill in the art would be able to determine an appropriate type, relative dimensions, and size of the bypass assembly for various applications. In certain embodiments, the bypass assembly may be telescoping or otherwise adjustable to permit for variation in dimensions of conduits 70, 80.

Figure 5E:
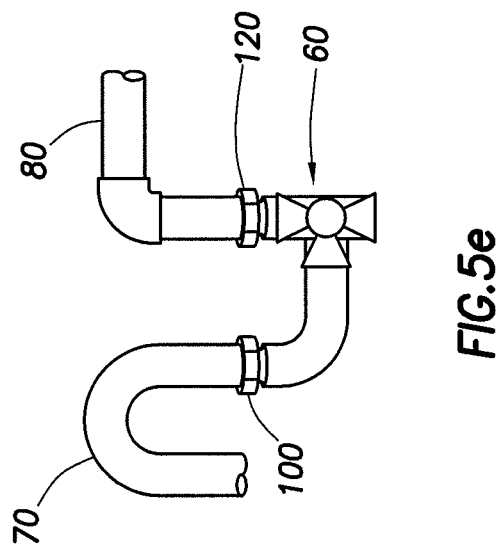
Figure 5D:
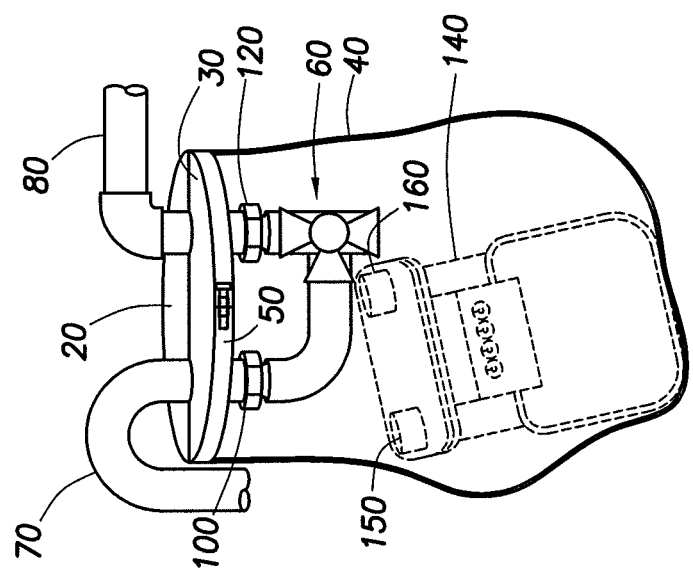

FIG. 5a-5e illustrate the various stages of one embodiment of a meter change-out operation using the meter change-out assembly 10 of the present invention. FIG. 5a illustrates meter 140 with support assembly (not shown) in place. Gas meter 140 is shown in fluid communication with inlet conduit 70 and outlet conduit 80. In particular, inlet conduit 70 is shown in fluid communication with meter inlet 150 and outlet conduit 80 is in fluid communication with meter outlet 160. The support assembly may be installed around conduits 70, 80, such that it can support plates 20, 30 and/or meter 140. Referring now to FIG. 5b, plates 20, 30 may be positioned so that notches 21, 22, 31, and 32 engage conduits 70, 80. Perimeter 130 may be formed around plates 20, 30, as they are positioned. Plates 20, 30 may then be fastened together. A strap or other meter support mechanism (not shown) may be used to attach a replacement meter to support assembly to support the weight of the replacement meter without support from bag 40. Alternatively, bag 40 may be constructed of reinforced materials, or otherwise configured to permit meter 140 to be supported by bag 40. Before bag 40 is connected, connections 100, 120 are loosened from meter conduits 150, 160 and 3-way valve 60 may be placed in bag 40. Bag 40 may be positioned along perimeter 130, such that at least a portion of bag 40 covers perimeter 130. After the bag 40 has been connected, bag 40 may be pressurized with gas before disconnecting meter 140. As illustrated in FIG. 5c, meter 140 may be disconnected from conduits 70, 80 by use of glove 42 to manipulate inlet connection 100 and outlet connection 120 associated with meter inlet 150 and meter outlet 160, respectively. After meter 140 is disconnected, fluid flow to outlet conduit 80 may be provided via pressurized gas within bag 40. Further, as illustrated in FIG. 5c, meter 140 and 3-way valve 60 may be permitted to rest in the bag 40 while bag 40 remains under pressure. Referring now to FIG. 5d, inlet 61 of 3-way valve 60 (which was already present in bag 40) may then be attached to gas inlet conduit 70, and outlet 63 of 3-way valve 60 may then be attached to gas outlet conduit 80 allowing gas to flow from inlet conduit 70, through 3-way valve 60, to outlet conduit 80. Referring now to FIG. 5e, bag 40 may then be removed, and in some embodiments, an external gas source may be connected to inlet 62 of 3-way valve 60. Switch 64 of 3-way valve 60 may then be switched to allow gas flow between inlet 61, inlet 62, outlet 63, or a combination thereof by adjusting the 3-way valve 60.

In other representative embodiments, an external gas source may be connected to external connection port 44 so that gas flow is not disrupted when bag 40 is removed. Y-valve assembly 65 may be attached to external connection port 44 and outlet conduit 80 while still within bag 40. Bag 40 may then be removed from perimeter 130. In some embodiments, an external gas source may be connected to Y-valve assembly 65 through external gas port 44 located on plates 20, 30.

Figure 6:
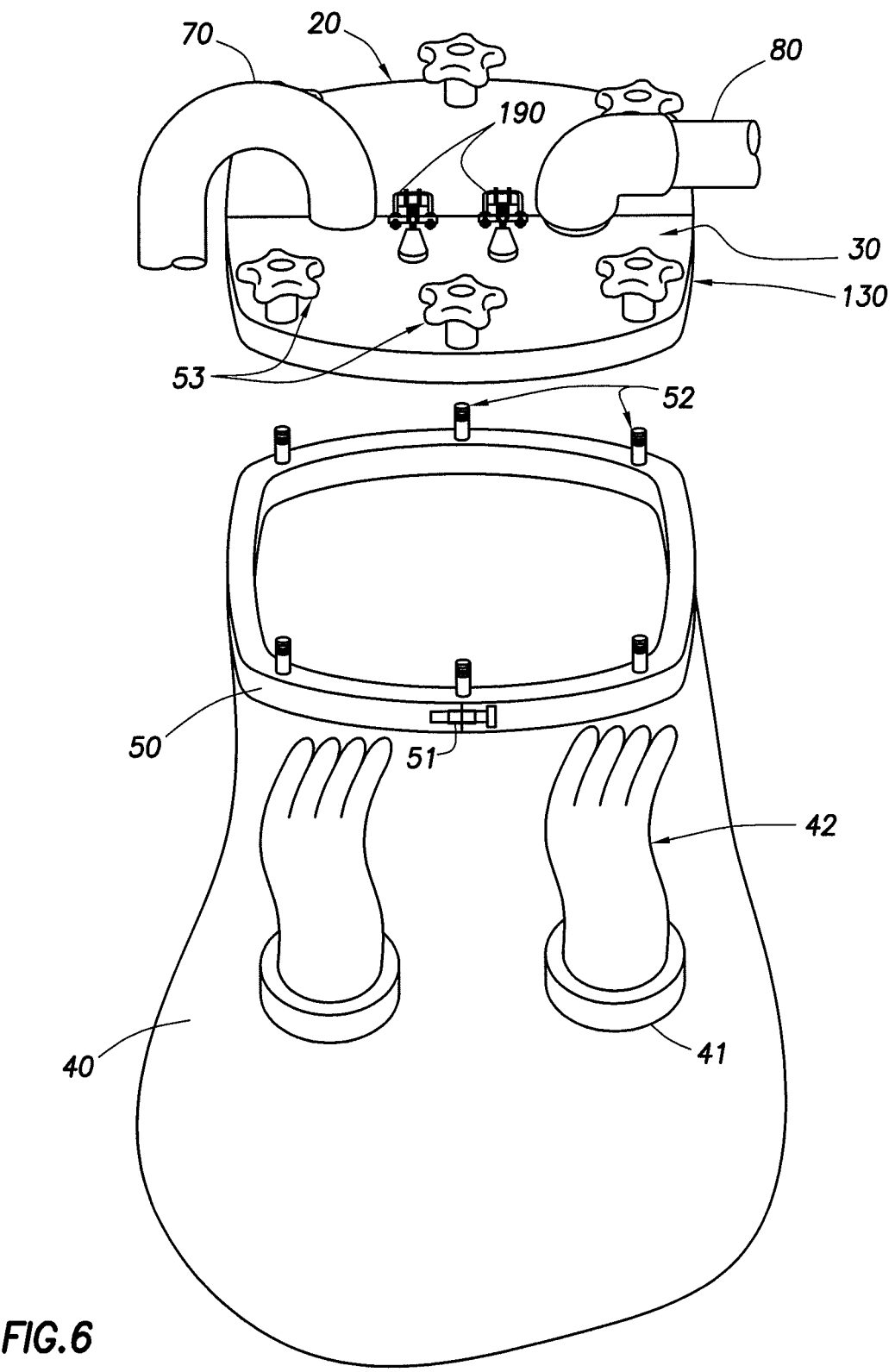
FIG. 6 is a partially exploded view of a gas service restoration and meter change-out assembly in accordance with one embodiment of the present invention.
Figure 6C:
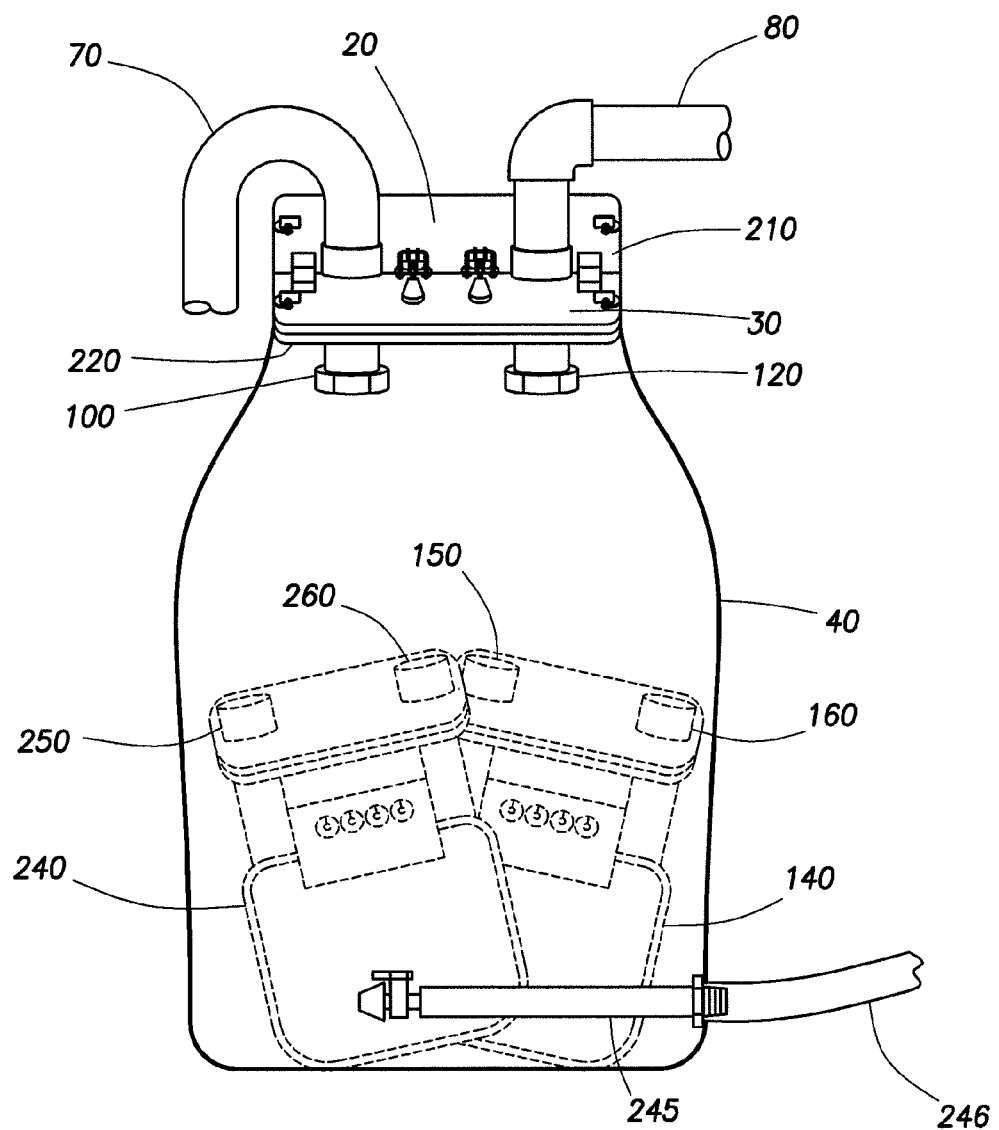
Figure 6E:
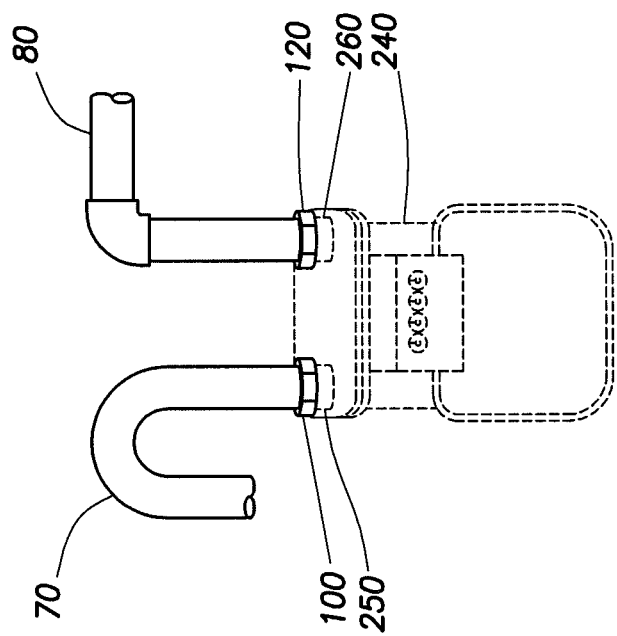
Figure 6D:
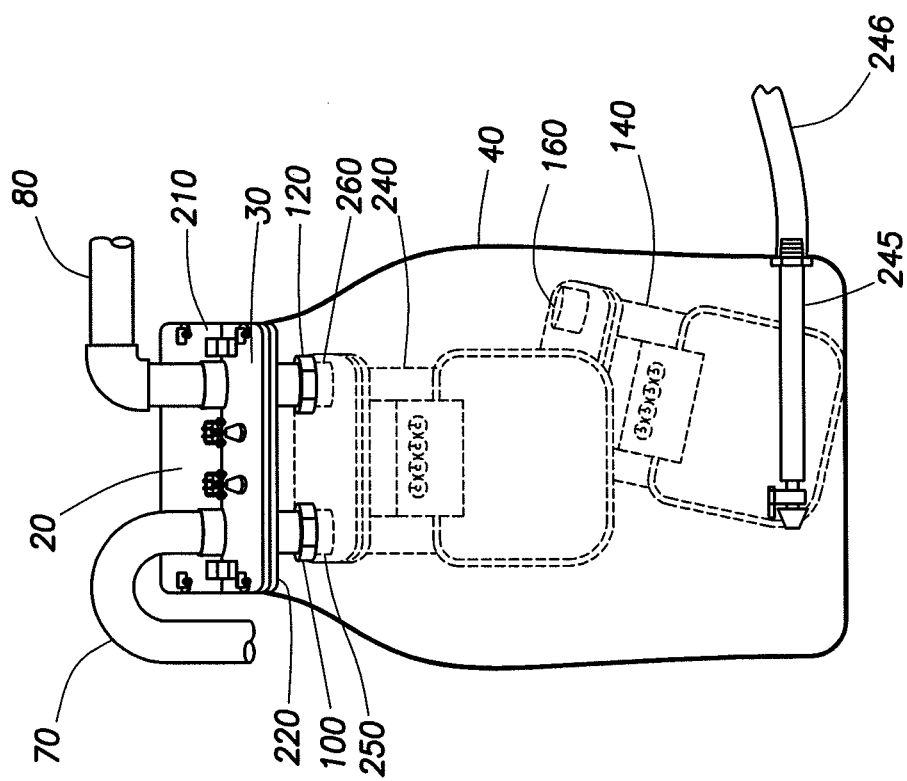

In one exemplary embodiment as shown in FIGS. 6a-6e. a new meter 240 may replace an old meter 140 in a single step without the use of the three-way valve 60. As shown in FIG. 6a, the new meter 240 may be placed inside the bag 40 before the meter change-out assembly 10 is mounted to the inlet conduit 70 and outlet conduit 80. As shown in FIG. 6b, the meter change-out assembly 10 is then connected to the conduits 70, 80, and gas leaks into the bag through the loosened connections 100, 120, in the same manner as discussed above in conjunction with FIG. 5b. In one exemplary embodiment, the bag 40 may include an exhaust tube 245. The exhaust tube 245 may be used to purge the bag 40 and avoid air flow through the outlet conduit 80. Specifically, the exhaust tube 245 may be opened to provide an outlet for the air in the bag 40 as the gas leaks into the bag 40 through the loosened connections 100, 120. In one exemplary embodiment the exhaust tube 245 may also be used to purge the new meter 240. In this embodiment, the exhaust tube 245 may include a mating portion that couples to one of the connections 250, 260 of the new meter 240. Any air trapped inside the new meter 240 may then be removed through the exhaust tube 245. Once the air in the bag 40 is removed through the exhaust tube 245, the exhaust tube 245 may be closed and the bag 40 becomes pressurized with gas as shown in FIG. 6c. The old meter 140 may then be removed and placed in the bag 40. Referring now to FIG. 6d, the inlet 250 of the new meter 240 may then be attached to the gas inlet conduit 70 and the outlet 260 of the new meter 240 may be attached to the gas outlet conduit 80. In one embodiment, the exhaust tube 245 may then be opened to remove any gas remaining in the bag 140 and depressurize the bag 40. In one exemplary embodiment, the exhaust tube 245 may be coupled to a hose 246. As would be appreciated by those of ordinary skill in the art, with the benefit of this disclosure, the hose 246 may be any length suitable for the particular application. In one exemplary embodiment, the hose 246 may be approximately 6 feet long in order to remove the gas to a safe distance away from the user of the meter change-out assembly 10 when the exhaust tube 245 valve is open. As shown in FIG. 6e, the meter change-out assembly 10 may then be removed with the new meter 240 in place.

As would be appreciated by those of ordinary skill in the art, with the benefit of this disclosure, although the exhaust tube 245 and the hose 246 are discussed in conjunction with the embodiment of FIGS. 6a-6e, they may be used in a similar manner when performing operations in accordance with FIGS. 5a-5e. Additionally, the exhaust tube 245 and/or the hose 246 may be made of any conductive materials such as, for example, graphite or carbon, to easily dissipate any static build up.

In some embodiments, any or all components of meter change-out assembly 10 may be formed so as to be operable in the temperature range of −20° F. to 150° F. In other embodiments, meter change-out assembly 10 may be formed so as to be operable in smaller temperature ranges, depending on the anticipated operating conditions. In other embodiments the components of meter change-out assembly 10 may be formed such that bag 40 may be inflated up to about 2 psig or up to about 5 psig without a substantial pressure loss. In some embodiments, the change-out procedure may be completed without the use of any tools (other than a wrench to loosen the existing connections).

FIG. 6 illustrates one embodiment of the gas service restoration and meter-change-out assembly which may be tool-free. First plate 20 and second plate 30 may cooperate to encircle an outer wall of an inlet conduit 70 and an outer wall of an outlet conduit 80. Plates 20, 30 may be constructed out of any type of material. In some embodiments, plates 20, 30 may be constructed out of aluminum or other metal, plastic, wood, polyethylene, vinyl, polyvinyl chloride ("PVC"), derivatives thereof, combinations thereof, or any other material suitable for use in gas applications.

Plates 20, 30 may be substantially flat, but the term "plate" should not be limited to any particular thickness dimension. First plate 20 may have inlet notch 21 (shown in FIG. 1) to engage the inlet conduit and outlet notch 22 (shown in FIG. 1) to engage the outlet conduit, and second plate 30 may have similar inlet notch 31 (shown in FIG. 1) and outlet notch 32 (shown in FIG. 1). Notches 21, 22, 31, 32 may be semicircular, or any other shape suitable for engaging conduits 70, 80. Notches 21, 22 may be positioned along the perimeter of first plate 20 and notches 31, 32 may be positioned along the perimeter of second plate 30. Inlet notches 21, 31 and outlet notches 22, 32 may be sized and positioned to cooperatively engage the outer walls of conduits 70, 80. In certain embodiments, inlet notches 21, 31 are situated on a same general side of respective plates 20, 30 as outlet notches 22, 32.

Plates 20, 30 may be of any size or shape suitable for engaging conduits 70, 80. In certain embodiments, plates 20, 30 may form any shaped perimeter which permits engagement with collar 50. Further, plates 20, 30 need not be identical, but rather may have different shapes suitable for engagement around conduits 70, 80 in a variety of configurations. Thus, plates 20, 30 may joined about conduits 70, 80 such that conduits 70, 80 are disposed at any of an unlimited number of locations within plates 20, 30. This feature may permit accessible workspace and facilitate attachment of meter change-out assembly 10 (shown in FIG. 1) in any number of applications, including those where meter 140 (shown in FIG. 2) is very close to a building.

In some embodiments, one or both plates 20, 30 may include star knobs 53 to facilitate tool-free engagement of collar 50 to plates 20, 30 utilizing threaded fasteners 52. While rotating star knobs 53 are disclosed, one skilled in the art would appreciate that various techniques may be used to provide for engaging plates 20, 30 which may vary in type, size, and relative dimensions. In some embodiments, plates 20, 30 may not have star knobs 53 attached to plates 20, 30. In other embodiments, plates 20, 30 may be designed to permit alignment with threaded fasteners 52 of collar 50, and star knobs 53 may be removed, loosened or tightened by hand to secure and release engagement of plates 20, 30 to collar 50. While star knobs 53 and threaded fasteners 52 are disclosed herein, one of ordinary skill in the art with the benefit of this disclosure would appreciate that various embodiments may be combined to arrive at many useful mating configurations dependent upon type of meter 140 (shown in FIG. 2), and type, size and relative dimensions of conduits 70, 80. The configurations disclosed herewith are generally by way of illustration and do not limit other configurations that may arise, that may be suitable to the application.

In some embodiments, meter change-out assembly 10 may include one or more seals to minimize or prevent gas leaks around and between the various components of meter change-out assembly 10. For example, as shown in FIGS. 1 and 1A, in one embodiment seals 26 may be placed between the plates 20, 30 and the conduits 70, 80. Similarly, seal 56 may be placed between the plates 20, 30 and collar 50. As would be appreciated by those of ordinary skill in the art, with the benefit of this disclosure, the seals 26, 56 may be arranged in a number of different ways and their disposition is not limited by what is depicted in FIGS. 1 and 1A. In some embodiments, bag 40 may be capable of self-sealing around the perimeter of collar 50. In yet other embodiments, bag 40 may be sealed around collar 50 utilizing a fastener 51 to create a seal between bag 40 and collar 50. In other embodiments, the seal may be a strip of material, an o-ring or any other type of seal capable of minimizing or preventing gas leaks. One skilled in the art would possess suitable technical knowledge to ensure that the seal would maintain a sufficient engagement between and around plates 20, 30 and the various components of meter change-out assembly 10 to ensure gas may be suitably contained under pressure.

In one exemplary embodiment, the meter change-out assembly 10 may include a pressure monitoring system 11. The pressure monitoring system 11 may include a pressure gauge located inside the meter change-out assembly 10. In one exemplary embodiment, the pressure gauge 13 may be mounted to one of the plates 20, 30. In another exemplary embodiment, the pressure gauge may be placed inside the bag 40. As would be appreciated by those of ordinary skill in the art, with the benefit of this disclosure, the pressure gauge may be any suitable gauge, including, but not limited to, a hydrostatic gauge, an aneroid gauge, a potentiometric gauge, a piezoresistive strain gauge, a capacitive gauge, a piezoelectric gauge, or an electronic digital pressure sensor. In one embodiment, the pressure gauge may be communicatively coupled to a pressure monitoring system. As would be appreciated by those of ordinary skill in the art, with the benefit of this disclosure, the pressure gauge 13 may be coupled to the pressure monitoring system 11 through a wired or wireless connection.

In one exemplary embodiment, the pressure monitoring system may be an information handling system that may include a processor, a memory, and an interface for communication with the pressure gauge. The pressure monitoring system may include a display for displaying the pressure measured by the pressure gauge in real time. In one exemplary embodiment, the pressure monitoring system may store the information received from the pressure gauge and use that information to prepare a pressure log for a time period predetermined by the user. In one exemplary embodiment, the pressure monitoring system may notify the user if the pressure inside the meter change-out assembly 10 falls below or raises above a threshold value. The information from the pressure monitoring system may be used by the user to monitor the process and ensure that the meter change-out process was performed effectively.

Figure 7:
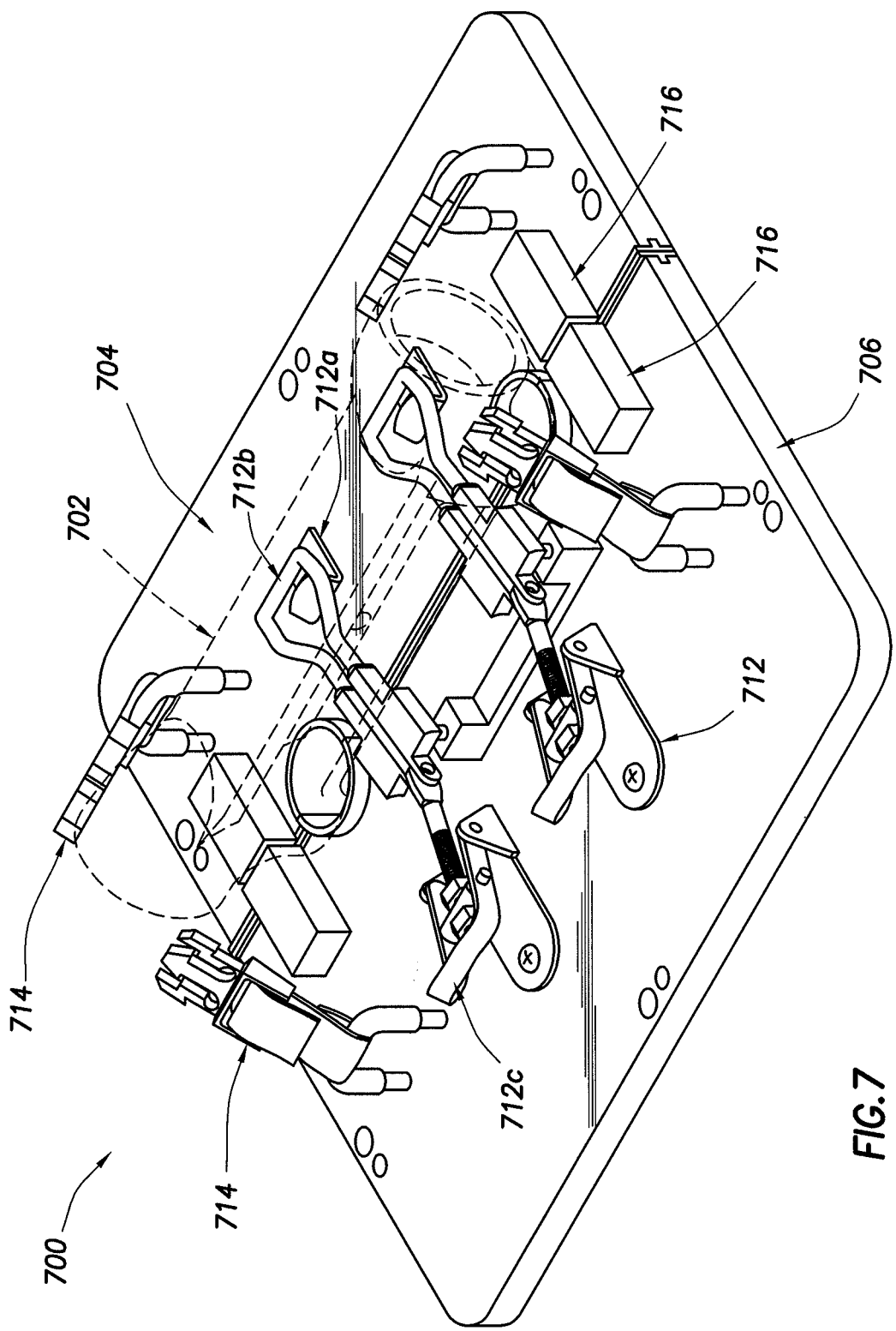
FIG. 7 is a perspective view of a first plate and a second plate of a meter change-out assembly in accordance with an embodiment of the present invention.

As shown in FIG. 7, in one exemplary embodiment the meter change-out assembly 700 may be adapted for use with meters that include a meter bar 702. As would be appreciated by those of ordinary skill in the art, with the benefit of this disclosure, the presence of the meter bar 702 reduces the space available for operations above the plates 704, 706.

The meter change-out assembly 700 may be installed and used in the same manner as discussed above in conjunction with FIGS. 5 and 6. Additionally, as shown in FIG. 7, plates 704, 706 may optionally be held in position about conduits 70, 80 by at least one fastener. The fastener may be a latch, clamp, screw, or any other device suitable for joining plates 704, 706. In one exemplary embodiment, the fastener may be a toggle latch 712 as shown in FIG. 7. Because the vertical movement of the toggle latch 712 below the meter bar 702 is small, it is well suited for use in the meter change-out assembly 700 where the meter bar 702 limits the availability of space above the plates 702, 704. The latch 712 may include a base 712a, an attachment portion 712b and a locking portion 712c, as shown in FIG. 7.

Additionally, in one embodiment, clasps 714 may be used to connect the meter change-out assembly 700 to the meter bar 702 so that the meter bar 702 provides some support for the meter change-out assembly 700.

In one embodiment, each of the plates 704, 706 may include guide pins 716 that mate with the guide pins of the other plate when the plates 704, 706 are properly aligned. The use of guide pins 716 ensures the proper installation of the plates 704, 706 in the field. Although the guide pins 716 are discussed in conjunction with FIG. 7, as would be appreciated by those of ordinary skill in the art, with the benefit of this disclosure, the guide pins 716 may also be used with the embodiments of the meter change-out assembly 10, as discussed in conjunction with FIG. 1-6.

Accordingly, the plates 704, 706 of the meter-change out assembly 700 may be coupled by first aligning the guide pins 716. Once the guide pins 716 are aligned, the attachment portion 712b of the toggle latch 712 may be attached to the base 712a. The locking portion 712c is then pressed down to lock the attachment portion 712b in place. The clasps 714 may be used to provide additional support for the meter change-out assembly 700.

One skilled in the art would appreciate that the various embodiments of the invention apparatus and embodiments of the invention methods disclosed herein can be modified by a substantial degree of permutations. While natural gas is generally stable, additional procedures and steps may be useful in enhancing the safety of any apparatus or method dealing with natural gas. By way of example, the use of an anti-static bar or grounding rod to discharge static energy away from meter change-outs or service restoration operations is a commonly accepted safety procedure and use of such techniques is envisioned within various embodiments of the invention. Likewise, one skilled in the art may find the use of anti-static spray and/or various other static discharge methods useful in constructing or using bag 40, collar 50, external port 44 or exhaust tube 245. The disclosure of anti-static spray for use with embodiments of the invention mentioned above are intended to be only illustrative. There are various techniques and advantages to utilizing anti-static sprays, grounding rods, and similar discharge techniques with various embodiments of the invention that one skilled in the art would appreciate and adapt from application to application depending upon the goals and purposes desired.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While gas meters and gas lines are disclosed herein, one of ordinary skill in the art will appreciate that the invention is suited for a number of applications where it is desirable to maintain flow through a line while performing repairs. Thus, this invention should not be limited to gas meter replacement operations. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. An assembly for maintaining fluid flow between an inlet conduit and an outlet conduit, the assembly comprising:
   a first plate having an inlet notch sized to engage the inlet conduit and an outlet notch sized to engage the outlet conduit;
   a second plate having an inlet notch sized to engage the inlet conduit and an outlet notch sized to engage the outlet conduit;
   a first connecting member integrally formed with the first plate and the second plate;
   a bag connectable to the first and second plates and having at least one glove port;
   wherein the bag is connected to a second connecting member; and
   a latch, wherein the latch connects the first connecting member to the second connecting member.

2. The assembly of claim 1 further comprising a support assembly capable of supporting the first and second plates when engaged with the inlet conduit and the outlet conduit.

3. The assembly of claim 1, comprising at least one seal between the first and second plates and the inlet and outlet conduits.

4. The assembly of claim 1, comprising at least one alignment device configured to align the first and second plates.

5. The assembly of claim 1, comprising at least one bypass assembly to connect with the inlet and outlet conduits.

6. The assembly of claim 1, wherein the bag is disposable.

7. The assembly of claim 1, wherein the first and second plate material comprises a material chosen from at least one of the following: metal, plastic, wood, polyethylene, vinyl, polyvinyl chloride, derivatives thereof, and combinations thereof.

8. The assembly of claim 1, comprising at least one fastener to engage the first and second plates.

9. The assembly of claim 1, wherein at least one of the first plate and the second plate is transparent.

10. The assembly of claim 1, wherein the bag has a substantially flat bottom surface.

11. The assembly of claim 1, wherein the bag material comprises a material chosen from at least one of the following: transparent material, translucent material, derivatives thereof, and combinations thereof.

12. The assembly of claim 1, further comprising an exhaust tube fluidically coupled to the bag.

13. A method for changing an old meter with a new meter, the method comprising:
   providing a first plate and a second plate, each having a first notch sized to engage the inlet conduit and a second notch sized to engage the outlet conduit;
   mating the first plate and the second plate in engagement with the inlet conduit and the outlet conduit;
   providing a bag connectable to the first and second plates;
   placing the new meter in the bag;
   loosening connections between the old meter and the inlet conduit and the outlet conduit;
   connecting the bag to the first and second plates;
   pressurizing the bag;
   removing the old meter connected to the inlet conduit and the outlet conduit;
   wherein the step of removing the meter is performed after connecting the bag;
   fluidly connecting the new meter to the inlet conduit and the outlet conduit; and
   removing the bag.

14. The method of claim 13, wherein an exhaust tube is opened to purge the bag before removing the old meter.

15. The method of claim 13, further comprising fluidically coupling the new meter to an exhaust tube and purging the new meter before removing the old meter connected to the inlet conduit and the outlet conduit.

16. The method of claim 13, further comprising opening an exhaust tube to drain at least a portion of gas in the bag before removing the bag.

17. The method of claim 16, wherein the exhaust tube is conductive.

18. An assembly for maintaining fluid flow between an inlet conduit and an outlet conduit, the assembly comprising:
   a first plate having an inlet notch sized to engage the inlet conduit and an outlet notch sized to engage the outlet conduit;
   a second plate having an inlet notch sized to engage the inlet conduit and an outlet notch sized to engage the outlet conduit;
   a first connecting member coupled to the first plate and the second plate;
   a bag having at least one glove port coupled to a second connecting member; and
   means for connecting the first connecting member to the second connecting member.

19. The assembly of claim 18, further comprising an exhaust tube fluidically connected to the bag.

20. The assembly of claim 18, wherein the glove port is elliptical.

21. The assembly of claim 18, further comprising a sleeve coupled to the glove port and a glove integrally formed with the sleeve.

22. The assembly of claim 18, further comprising a sleeve coupled to the glove port and a glove coupled to the sleeve at a glove interface.

23. The assembly of claim 22, wherein the sleeve is accordion shaped.

24. The assembly of claim 23, wherein the sleeve is reinforced.

25. The assembly of claim 24, further comprising reinforcing rings placed around one or more fingers of the glove.

26. The assembly of claim 22, further comprising:
   an inner ring positioned around an inside perimeter of the sleeve corresponding to the glove interface;
   at least one channel formed around an outside perimeter of the sleeve corresponding to the glove interface; and
   at least one retention strap for compressing the glove into the at least one channel when the glove is coupled to the sleeve.

27. The assembly of claim 26, further comprising an outer band;
   wherein the outer band covers the at least one channel and the at least one retention strap.

28. The assembly of claim 18, wherein the means for connecting the first connecting member to the second connecting member comprises a cam lock.

29. The assembly of claim 18, further comprising a pressure gauge, wherein the pressure gauge is coupled to one of the first plate, the second plate, and the bag.

30. The assembly of claim 29, wherein the pressure gauge is selected from the group consisting of a hydrostatic gauge, an aneroid gauge, a piezoresistive strain gauge, a capacitive gauge, a piezoelectric gauge and an electronic gauge.

31. The assembly of claim 29, further comprising a pressure monitoring system communicatively coupled to the pressure gauge.

32. The assembly of claim 31, wherein the pressure monitoring system is operable to notify a user if pressure inside the bag raises above or falls below a threshold value.

33. The assembly of claim 31, wherein the pressure monitoring system is communicatively coupled to the pressure gauge through one of a wired connection and a wireless connection.

34. The assembly of claim 18, further comprising a first gasket corresponding to the first connecting member and a second gasket corresponding to the second connecting member, wherein the first gasket and the second gasket provide a seal when the first connecting member is connected to the second connecting member.

35. The assembly of claim 18, wherein the first plate and the second plate are coupled with a latch.

36. The assembly of claim 35, wherein the latch is a toggle latch.

37. The assembly of claim 18, further comprising one or more clasps for attaching at least one of the first plate and the second plate to at least one of the inlet conduit, the outlet conduit and a bar running between the inlet conduit and the outlet conduit.

38. The assembly of claim 18, further comprising guide pins, wherein the guide pins align the first plate and the second plate.

* * * * *